(12) United States Patent
Ramachandran

(10) Patent No.: US 10,671,443 B1
(45) Date of Patent: Jun. 2, 2020

(54) INFRASTRUCTURE RESOURCE MONITORING AND MIGRATION

(71) Applicant: Capital One Services, LLC, McLean, VA (US)

(72) Inventor: Ramesh Ramachandran, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/513,601

(22) Filed: Jul. 16, 2019

(51) Int. Cl.
| G06F 9/46 | (2006.01) |
| G06F 9/50 | (2006.01) |
| G06N 20/00 | (2019.01) |
| G06F 9/54 | (2006.01) |
| G06F 16/903 | (2019.01) |

(52) U.S. Cl.
CPC .......... *G06F 9/5077* (2013.01); *G06F 9/5011* (2013.01); *G06F 9/541* (2013.01); *G06F 9/546* (2013.01); *G06F 16/903* (2019.01); *G06N 20/00* (2019.01)

(58) Field of Classification Search
None
See application file for complete search history.

(56) References Cited

U.S. PATENT DOCUMENTS

| 9,438,466 | B1 * | 9/2016 | O'Gorman | .......... H04L 41/0213 |
| 10,042,697 | B2 | 8/2018 | Ahad | |
| 2012/0324073 | A1 * | 12/2012 | Dow | .......... G06F 9/06 709/223 |
| 2015/0143364 | A1 * | 5/2015 | Anderson | ............. G06F 9/5088 718/1 |
| 2016/0092484 | A1 * | 3/2016 | Finkler | ............... G06F 16/2272 707/715 |
| 2017/0024717 | A1 | 1/2017 | Istrati | |
| 2018/0307945 | A1 | 10/2018 | Haigh et al. | |

FOREIGN PATENT DOCUMENTS

| CN | 108197261 A | 6/2018 |
| CN | 108540352 A | 9/2018 |

* cited by examiner

*Primary Examiner* — Wissam Rashid
(74) *Attorney, Agent, or Firm* — Sterne, Kessler, Goldstein & Fox P.L.L.C.

(57) ABSTRACT

Disclosed herein are computer-implemented method, system, and computer-readable storage-medium embodiments for implementing infrastructure resource monitoring and migration. An embodiment includes retrieving, via an API, a plurality of resource metrics; and ingesting, via a data-processing pipeline, the plurality of resource metrics. Some embodiments may further include queuing, via a stream-processing platform, the plurality of resource metrics. The first set of resource metrics and second set of resource metrics may be selected by at least one computer processor via an application framework. Further embodiments may include populating a time-series database with data comprising the first set of resource metrics and second set of resource metrics, using the at least one computer processor. The at least one computer processor may compute first and second indices corresponding to respective first and second values and perform comparison of the indices. Some embodiments may further include migrating, based on the comparison, a computing service between resources.

20 Claims, 7 Drawing Sheets

INFRASTRUCTURE RESOURCE MONITORING AND MIGRATION

BACKGROUND

For resources that have dynamically varying metrics relating to their use, such resources may be difficult if not impossible to allocate efficiently. Various resource-allocation problems may exist in complex systems with dynamically fluctuating resources. An example of such resources is cloud-computing infrastructure. Many large-scale deployments of cloud-computing services may include petabytes to exabytes of distributed data storage, as well as many teraFLOPS to petaFLOPS of distributed computing capabilities across thousands of nodes. The resulting complexity of this scale makes monitoring and prediction of cloud-computed resource metrics (e.g., capacity, cost, efficiency) burdensome or inaccurate, if not infeasible.

A cloud administrator, or automated administration tool, lacking access to information of contemporaneous operating conditions for multiple infrastructure options may in turn have difficulty making decisions of where to deploy or migrate computing services across those multiple infrastructure options. Reliance on old information that is no longer accurate and/or relying on ill-informed speculation about future metrics, may involve substantial risk of suboptimal performance of the computing services where projected future metrics deviate from actual values as time progresses.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer-readable storage-medium embodiments, and/or combinations and sub-combinations thereof, for infrastructure resource monitoring and migration.

Figure 1:
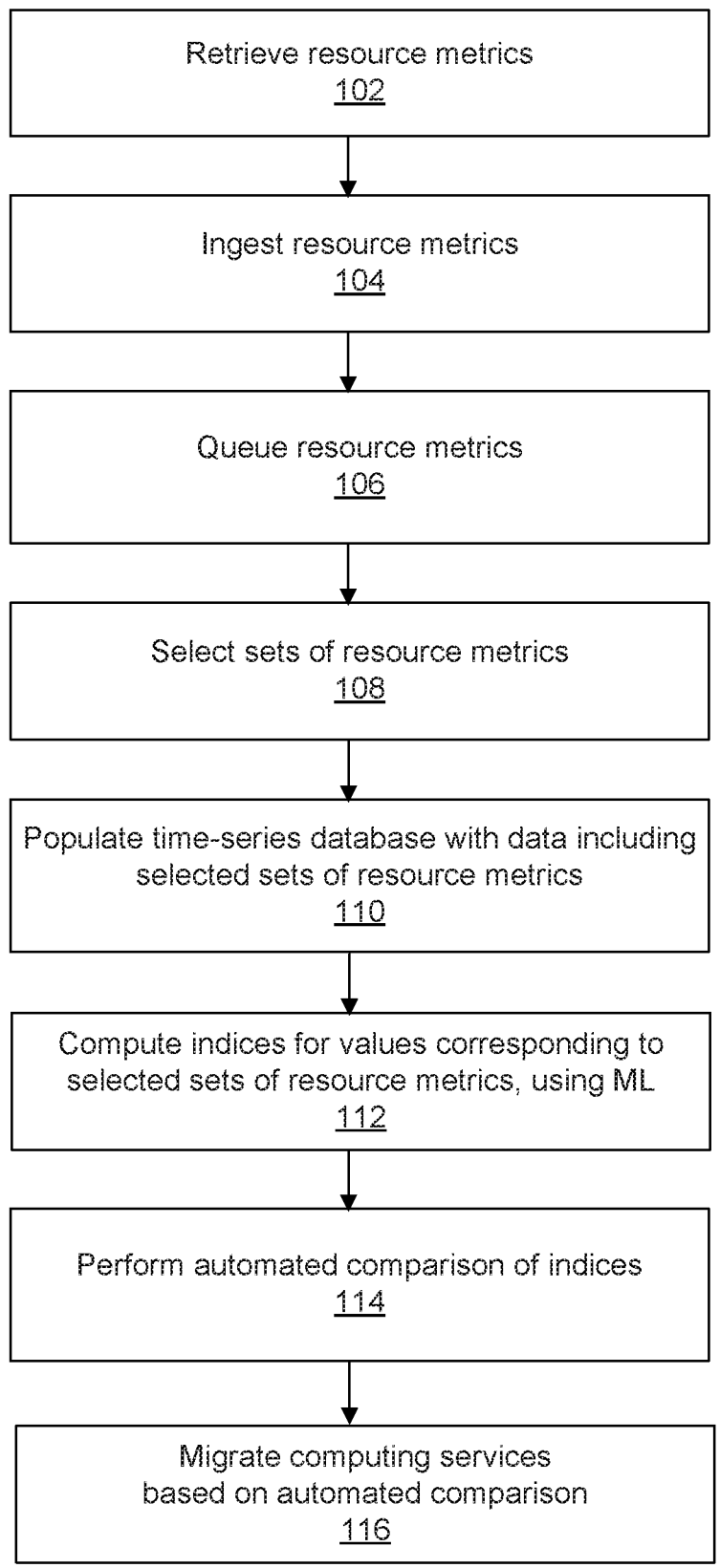
FIG. 1 is a flowchart illustrating a process implementing some of the enhanced techniques described herein, according to some embodiments.

FIG. 1 illustrates a method 100 for operation of an enhanced infrastructure resource monitoring and migration techniques described herein, according to some embodiments. Method 100 may be performed by processing logic that may comprise hardware (e.g., circuitry, dedicated logic, programmable logic, microcode, etc.), software (e.g., instructions executing on a processing device), or a combination thereof. Not all steps of method 100 may be needed in all cases to perform the enhanced techniques disclosed herein. Further, some steps of method 100 may be performed simultaneously, or in a different order from that shown in FIG. 1, as will be understood by a person of ordinary skill in the art.

Method 100 shall be described with reference to FIGS. 1, 2, and 4. However, method 100 is not limited only to those example embodiments. The steps of method 100 may be performed by at least one computer processor coupled to at least one memory device. An exemplary processor and memory device(s) are described below with respect to FIG. 4. In some embodiments, method 100 may be performed by components of system 200 of FIG. 2, which may further include at least one processor and memory such as those of FIG. 4. The processor shown in FIG. 4 becomes a specialized processor when programmed or configured as described herein.

In 102, at least one processor 404 may be configured to retrieve resource metrics via at least one application programming interface (API). In some embodiments, the resource metrics may originate from multiple different sources and relate to their originating sources (e.g., in terms of describing capacity, cost, efficiency, usage, etc.). This scenario is not limiting—in the same or different embodiments, the same or similar resource metrics may originate from one or many sources, and may describe or otherwise relate to any given resources, whether or not those resources originate the resource metrics to be retrieved.

Also in 102, an API may be understood as any protocol, framework, floorplan, or interface enabling programmatic interaction or communication, allowing a given computing program, process, thread, etc., to communicate with another designated program, process, thread, etc., locally or remotely, such as on a different virtual or physical host machine, over a network, bus, or other stack for data exchange. More API examples are provided in this Detailed Description, including further below.

Information, including resource metrics, available via an API for cloud-computing resources may include usage of a given infrastructure, platform, or related resource (e.g., data storage presently occupied or reserved, upstream or downstream data transfer used, number of computing nodes or processors occupied, number of virtual machines or containers deployed, amount of memory in use, amount of processor time or number of processor cycles consumed, number of anonymous functions called, etc.).

Other information, including resource metrics, may include available capacity (e.g., total available capacity for a given subscription, service level, and/or service tier; capacity over a given time frame; capacity over recurring schedules; etc.), where the capacity may be in terms of unused data storage; computing nodes, processors (physical or logical cores), virtual machines, containers, or memory that can be allocated; available processing or network bandwidth; or practically any other resource available within a given level, tier, or subscription for a given platform or infrastructure (or other "as a service" model of cloud-computing resources, described further below).

Additionally or alternatively, resource metrics may include information on cost of using certain resources on a given platform or infrastructure, for example. In some embodiments, a different API may be used for a given type of resource metrics (e.g., usage, billing, capacity, etc.), depending on how a given platform or infrastructure may make such information available to its users and/or to the public. Cost information may include real-time going rates for particular resources, scheduled rates at designated times, or scaled rates based on existing or projected (designated) usage values, e.g., where costs may increase or decrease based on an amount used, such as when the used amount exceeds a predetermined threshold.

In some cases, capacity, cost, and usage, may be interdependent in any combination of dependency relationships. In further embodiments, resource metrics may include efficiency, such as in terms of usage versus capacity or vice-versa. Additionally, or alternatively, cost efficiency may be calculated, queried, or retrieved, such as for cost of usage over a particular time period.

For any of the above resource metrics, rates of change may also be calculated, queried, or retrieved. A given rate of change may serve as at least one input into a prediction calculation of future parameters for a corresponding resource metric.

In some embodiments, multiple corresponding resource metrics may be retrieved from multiple different instances or providers of a given type of platform or infrastructure resource, for example. Thus, to provide a specific example of cloud-computing resources, resource metrics from Amazon Elastic Compute Cloud (EC2) may be retrieved alongside corresponding metrics for comparable offerings from Microsoft Azure and/or Google Anthos (formerly Cloud Services Platform), to name a few non-limiting examples.

Accordingly, processor 404 may be configured to retrieve a set of resource metrics from EC2, a set of resource metrics from Azure, and/or a set of resource metrics from Anthos, among other sources including platform or infrastructure providers, in this example. A set of resource metrics may correspond to a given resource, whereas another set of resource metrics may correspond to another resource, which may be a corresponding resource from different provider, for example. The resource metrics may not need to have a one-to-one correspondence across multiple sets, in some embodiments.

In 104, processor 404 may be configured to ingest the retrieved resource metrics via a data-processing pipeline. In some embodiments, the retrieved resource metrics may be unstructured, or may conform to a plurality of different structural formats or schemata that may not be cross-compatible. Certain data-processing pipelines may be configured to accept such input in real time and/or in batches such as with bulk importation or ingestion, via at least one API such as above, or via at least one other data transfer protocol or mechanism, for example.

Examples of data-processing pipelines include, but are not limited to, Elastic Logstash, Graphite Carbon, Prometheus, and similar components of other suites or hosted services, including Datadog, Fluentd, Splunk, Motadata, etc. Thus, the data-processing pipeline used here, in some embodiments, may itself operate on cloud-computing infrastructure, which may also include use of the same resources being monitored with the resource metrics to be ingested, for example. In some embodiments, the ingested resource metrics may, over time, form collections of data similar to logs of the resource metrics.

In 106, processor 404 may be configured to queue the ingested resource metrics via a stream-processing platform. The stream-processing platform may, in some embodiments, provide its own structure for the resource metrics to be queued. In further embodiments, whether or not the stream-processing platform structures or restructures resource metrics to be queued, the stream-processing platform may implement measures to ensure delivery of a given resource metric that is queued.

Examples of stream-processing platforms include, but are not limited to, Apache Kafka, NSQ, 0MQ, nanomsg, ActiveMQ, RabbitMQ, and similar components of other suites or hosted services, including Apache Pulsar, Amazon Simple Queue Service (SQS), Amazon Web Services (AWS) Kinesis, Azure Event Hub, Google Pub/Sub, etc. Thus, the stream-processing platform used here, in some embodiments, may itself operate on cloud-computing infrastructure, which may also include use of the same resources being monitored with the resource metrics to be ingested, for example. In some embodiments, the ingested resource metrics may, over time, form messaging queues populated with the resource metrics, for example.

In 108, processor 404 may be configured to select at least one set of resource metrics via an application framework. The application framework may be customized for a given monitoring target and/or external interface, for example implementing its own API, and/or including a user interface, such as a web layer with a front end. Additionally, or alternatively, such an application framework and/or external interface may be a turnkey solution previously built or configured by a third party, for example. Selection of a given resource metric or set of resource metrics may, in some embodiments be directed by input from an administrator or other user. Additionally, or alternatively, selection of the given resource metric or set of resource metrics may be partially or fully automated, according to some embodiments.

Examples of application frameworks include, but are not limited to, Apache Struts, Spring Boot, Hibernate, Django, Flask, Rails, Laravel, Kepler, Angular, etc. Further examples of frameworks are provided below. Implementation of the application framework, in some embodiments, may be a single server, virtual machine, container, jail, zone, or similar environment. Additionally, or alternatively, the application framework may be hosted on a cloud service or platform, including use of the same resources being monitored with the resource metrics to be monitored, ingested, and queued, for example.

In 110, processor 404 may be configured to populate a time-series database with data, which may include the sets of resource metrics selected at 108 above, for example. In some embodiments, a time-series database may be instantiated for each monitored resource metric across various providers. Examples of time-series databases include, but are not limited to, InfluxDB, OpenTSDB, HBase, Cube, Axibase, Reconnoiter, Beringei, KairosDB, RRDtool, and similar components of other suites or hosted services, including Graphite, Amazon Timestream, Zenoss, etc., to name a few non-limiting examples.

In 112, processor 404 may be configured to compute indices for values corresponding to sets of resource metrics selected at 108 above, for example. In some embodiments, such indices may be used for comparisons, as in 114 below. An index may be used as an intermediate value, for example, when resource metrics may not be directly comparable, such as with each other or with a given benchmark, standard, or other threshold value, for example. Thus, an index may be a scaled value of a resource metric, in some embodiments.

Additionally, or alternatively, an index may be a normalized value of the resource metric, including statistical analysis (e.g., time-averaged value, dynamic ranges, standard deviations, etc.), for example, or otherwise converting raw values of resource metrics into other index values that may be more readily compared. Further non-limiting examples of computing an index include real-time linear transformations such as rate conversions (e.g., unit costs, currencies, efficiencies, etc.). Additionally, or alternatively, computation of an index may involve reformatting or restructuring resource metrics and/or corresponding data structures to allow more ready comparisons, such as in 114 below.

Index values, as described above, may additionally represent values or secondary resource metrics not directly available from providers via any interface. For example, an index value may be expressed in terms of a custom service hosted on one of the platforms, such as a computationally intensive service for multimedia transcoding or interactive gaming, in some embodiments. Thus, such index values in this case may represent platform cost per minute of game play, platform cost per hour of transcoded video stream, etc. Other such index values may be more generalized, but still not available from the originating platform, e.g., continued operating cost per gigaFLOPS, rather than straight cost of occupying a computing node for a unit of time, depending on platform capabilities.

In 114, processor 404 may be configured to perform an automated comparison of indices. In some embodiments, indices for comparison may include indices of comparable resource metrics of a similar cloud-computing resource from one provider versus another provider. For example, a cost-per-FLOPS index of EC2 may be compared with a cost-per-FLOPS index of Azure. In further embodiments, comparisons may be across multiple comparable metrics, such as the same corresponding index (for any comparable resource metric) of EC2, Azure, Anthos, Vultr, Linode, DigitalOcean, Heroku, Internap, AliCloud, on-premises infrastructure, etc., to list a few non-limiting examples. A result of such a comparison may be a maximum or minimum value, for example, or a tuple that may include rank values and/or identifiers of various providers, in some embodiments.

Processor 404 may be configured to store results of the comparison in memory on a temporary basis, for example. In some embodiments, comparisons may be logged over time and stored in a database at certain intervals and/or according to certain events or conditions, for example. Thus, the comparison may also consider trends of indices and comparisons over time. The comparison may, in some embodiments, account for differential thresholds from one index (corresponding resource metric) to another, e.g., greater than 10% above or below another index for comparison.

In some embodiments, the computation of 112, comparison of 114, and/or migration of 116 (below) may involve use of neural networks, artificial intelligence (AI), or machine learning, as described further below with respect to machine learning 250. Thus, beyond preliminary storage, organization, and processing of data including resource metrics, further logic may be employed to generate forecasts or predictions of future parameters corresponding to metrics or indices, and/or to generate estimates of current states of various values of resource metrics or corresponding indices, for example. With respect to such machine learning, computed indices may serve as inputs, intermediate values, outputs, or any combination thereof, and such machine learning may inform any migration (or instruction/recommendation therefor) as described with respect to 116 further below.

In 116, processor 404 may be configured to migrate (or instruct migration of) computing services based on the automated comparison of 114. For example, migration may involve spinning down a service on one platform or infrastructure provider and spinning up essentially the same service on another platform or infrastructure provider (in no particular order), based on the comparison. For example, upon determining that a specific provider has availability for improved capacity, cost, performance, efficiency, or another resource metric that is better than a corresponding resource metric of a provider currently in use, processor 404 may be configured to migrate a computing service from the provider currently in use to the specific provider having a better corresponding resource metric.

In some embodiments, the migration may involve leaving the service on the same platform or infrastructure provider, but configuring a given computing service on that platform or infrastructure to scale up or down automatically, to improve the underlying resource metric being monitored. The scaling up or down may be targeting a level consistent with a more efficient rate of cost, performance, or efficiency, for example. In some embodiments, in lieu of processor 404 performing or instructing the migration, processor 404 may additionally or alternatively be configured to generate a recommendation for such migration. The recommendation may be made available for subsequent evaluation, which may be automatic or manual, in some embodiments.

In method 100, depending on any given resources or resource metrics and depending on how resource metrics data may already be available and structured with respect to the computer-based implementation of 102-112, any one or more of 102-112 may be skipped as needed, according to some embodiments.

Figure 2:
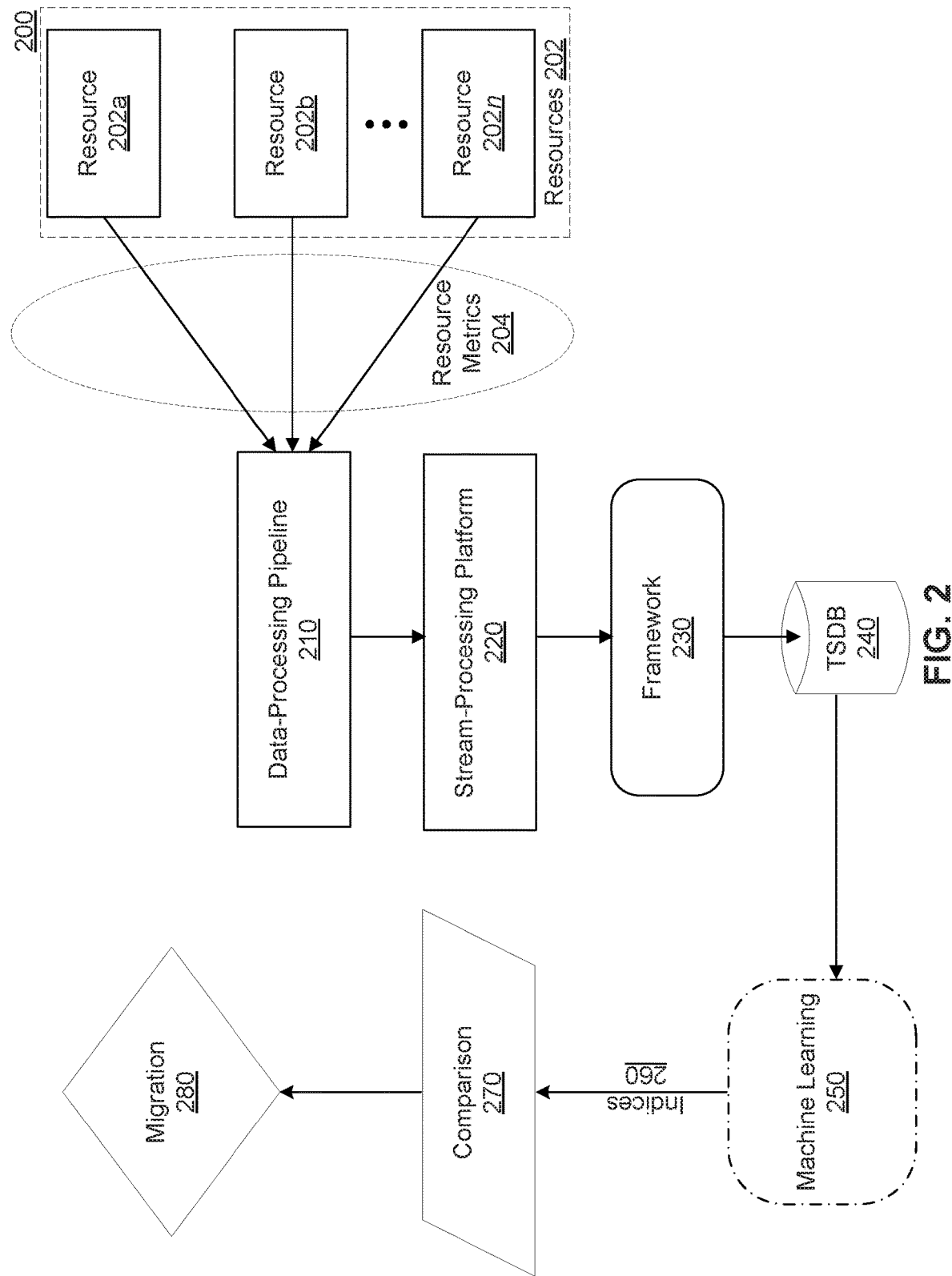
FIG. 2 is a diagram illustrating an example interaction among some system components, according to some embodiments.

FIG. 2 is a diagram illustrating an example interaction of components of an example system 200 among some system components, according to some embodiments. These components may further include at least one processor and memory such as those of FIG. 4. As a practical implementation, any action orchestrated between any components shown in FIG. 2 may, in some embodiments, be treated as an example of any corresponding step in method 100 implementing enhanced techniques described herein for infrastructure resource monitoring and migration, for example.

Resources 202 may include any number of resources, local or remote, such as a first resource 202a, a second resource 202b, up to an nth resource 202n, for any arbitrary whole number n. Any individual resource of resources 202 may or may not be considered part of system 200, for purposes of system design and implementation. However, system 200 may be configured to interact with any individual resource that may not be part of system 200. Any of the resources 202 may have corresponding resource metrics 204, individually and/or collectively, which may be retrieved/collected for ingestion, such as into data-processing pipeline 210.

In some embodiments, resources 202 may include cloud-computing platform or infrastructure resources. Some of the individual resources, e.g., first resource 202a, second resource 202b, nth resource 202n, etc., may be remotely hosted by different service providers and/or may be locally owned or operated self-hosted technologies, such as with on-premises infrastructure. Some examples of cloud-computing service providers include EC2, Azure, Anthos, Vultr, Linode, DigitalOcean, Heroku, Internap, and AliCloud, to list a few non-limiting examples. Various "as a service" offerings that cloud-computing service providers may provide are further described elsewhere in this Detailed Description.

Resource metrics 204 may include information indicating usage of a given infrastructure, platform, or related resource (e.g., data storage presently occupied or reserved, upstream or downstream data transfer used, number of computing nodes or processors occupied, number of virtual machines or containers deployed, amount of memory in use, amount of processor time or number of processor cycles consumed, number of anonymous functions called, etc.).

Further, resource metrics 204 may include available capacity (e.g., total available capacity for a given subscription, service level, and/or service tier; capacity over a given time frame; capacity over recurring schedules; etc.), where the capacity may be in terms of unused data storage; computing nodes, processors (physical or logical cores), virtual machines, containers, or memory that can be allocated; available processing or network bandwidth; or practically any other resource available within a given level, tier, or subscription for a given platform or infrastructure (or other "as a service" model of cloud-computing resources, described further below).

Additionally or alternatively, resource metrics 204 may include information on cost of using certain resources on a given platform or infrastructure, for example. Such cost information may include real-time going rates for particular resources, scheduled rates at designated times, or scaled rates based on existing or projected (designated) usage values, e.g., where costs may increase or decrease based on an amount used, such as when the used amount exceeds a predetermined threshold.

In some cases, capacity, cost, and usage, may be interdependent in any combination of dependency relationships. In further embodiments, resource metrics may include efficiency, such as in terms of usage versus capacity or vice-versa. Additionally, or alternatively, cost efficiency may be calculated, queried, or retrieved, such as for cost of usage over a particular time period.

For any of the above resource metrics, rates of change may also be calculated, queried, or retrieved. A given rate of change may be serve as at least one input into a prediction calculation of future parameters for a corresponding resource metric.

In some embodiments, multiple corresponding resource metrics may be retrieved from multiple different instances or providers of a given type of platform or infrastructure resource, for example. Thus, to provide a specific example of cloud-computing resources, resource metrics from EC2, Azure, Anthos, Vultr, Linode, DigitalOcean, Heroku, Internap, AliCloud, on-premises infrastructure, etc., to name a few non-limiting examples.

Data-processing pipeline 210 may include a software stack providing algorithms and data structures to handle incoming data, such as resource metrics, which may be unstructured, or may conform to a plurality of different structural formats or schemata that may not be cross-compatible. Certain embodiments of data-processing pipeline 210 may be configured to accept such input in real time and/or in batches such as with bulk importation or ingestion, via at least one API such as above, or via at least one other data transfer protocol or mechanism, for example. Data-processing pipeline 210 may further provide for output, structured or unstructured, in real time or in batches, to various other programs or services, via at least one interface, such as an API.

Examples of data-processing pipeline 210 may include, but are not limited to, Elastic Logstash, Graphite Carbon, Prometheus, and similar components of other suites or hosted services, including Datadog, Fluentd, Splunk, Motadata, etc. Thus, data-processing pipeline 210 used here, in some embodiments, may itself operate on cloud-computing infrastructure, which may also include use of the same resources 202 being monitored with the resource metrics 204 to be ingested, for example. In some embodiments, the ingested resource metrics 204 may, over time, form collections of data similar to logs of the resource metrics 204, for example.

Stream-processing platform 220 may include a software stack providing algorithms and data structures to handle data, such as resource metrics, which may be made available from data-processing pipeline 210, for example. Stream-processing platform 220 may, in some embodiments, provide its own structure for the resource metrics to be queued. In further embodiments, whether or not stream-processing platform 220 structures or restructures resource metrics to be queued, stream-processing platform 220 may implement measures to ensure delivery of a given resource metric that is queued.

Examples of stream-processing platform 220 include, but are not limited to, Apache Kafka, NSQ, OMQ, nanomsg, ActiveMQ, RabbitMQ, and similar components of other suites or hosted services, including Apache Pulsar, Amazon Simple Queue Service (SQS), Amazon Web Services (AWS) Kinesis, Azure Event Hub, Google Pub/Sub, etc. Thus, stream-processing platform 220 used here, in some embodiments, may itself operate on cloud-computing infrastructure, which may also include use of the same resources 202 being monitored with the resource metrics 204 to be ingested, for example. In some embodiments, the ingested resource metrics 204 may, over time, form messaging queues populated with resource metrics 204, for example.

Framework 230 may include an application framework and/or web framework, which may be customized for a given monitoring target and/or external interface (not shown), for example implementing its own API, and/or including a user interface, such as a web layer with a front end. Additionally, or alternatively, framework 230 and/or external interface may be a turnkey solution previously built or configured by a third party, for example. Selection of a given resource metric or set of resource metrics 204 may, in some embodiments be directed by input from an administrator or other user. Additionally, or alternatively, selection of the given resource metric or set of resource metrics 204 may be partially or fully automated, according to some embodiments.

Examples of framework 230 include, but are not limited to, Apache Struts, Spring Boot, Hibernate, Django, Flask, Rails, Laravel, Kepler, Angular, etc. Further examples of frameworks generally are provided below. Implementation of framework 230, in some embodiments, may be a single server, virtual machine, container, jail, zone, or similar environment. Additionally, or alternatively, the application framework may be hosted on a cloud service or platform, including use of the same resources being monitored with the resource metrics 204 to be monitored, ingested, and queued, for example.

Time-series database 240 (TSDB) may include a software stack providing algorithms and data structures configured to handle time-series data and which may further implement at least some database features. In some embodiments, time-series database 240 may be instantiated separately for each monitored resource metric 204 across various providers.

Examples of time-series database 240 include, but are not limited to, InfluxDB, OpenTSDB, HBase, Cube, Axibase, Reconnoiter, Beringei, KairosDB, RRDtool, and similar components of other suites or hosted services, including Graphite, Amazon Timestream, Zenoss, etc., to name a few non-limiting examples. Other types of databases may be adapted to provide functionality better suited for time-series data, in some embodiments, any of which may then effectively serve as time-series database 240.

Machine learning 250 may include one or more software stacks providing algorithms and data structures configured to implement any number of neural networks or AI capabilities, any of which may be suitable for generating estimates and/or predictions of what a given resource metric (or related value or index) may be in the present (estimate) or in the future (prediction/forecast). Depending on resource metrics 204 relating to a given value or parameter for a metric or index for comparison, estimate, or forecast, different algorithms may be employed, such as a linear regression algorithm or a logistic regression algorithm, to name a few non-limiting examples.

Further embodiments of machine learning 250 may be based at least in part on convolutional neural network (CNN) processing, for example. At least one CNN (not shown) may integrate any number of filters to indices 260 (described further below) based on resource metrics 204, across multiple iterations, to identify emergent trends in the resource metrics 204, for example. Such filters may include various algorithms and/or predetermined thresholds to detect change and/or identify rates of change, points of inflection, or certain trends or outliers (breaks from trends), within relatively large sets of resource metrics, in some embodiments. For desired results, a given artificial neural network (ANN), including a CNN, may be designed, customized, and/or modified in various ways, for example, according to several criteria, according to some embodiments.

Indices 260 may be used for comparisons 270 as shown below. An index may be used as an intermediate value, for example, when resource metrics may not be directly comparable, such as with each other or with a given benchmark, standard, or other threshold value, for example. Thus, indices 260 may be scaled values of resource metrics 204, in some embodiments. With respect to machine learning 250 as described above, indices 260 may serve as inputs, intermediate values, outputs, or any combination thereof. Machine learning 250 may inform any migration 280 (or instruction/recommendation therefor) as described with respect to 116 above and migration 280 as also described further below.

Additionally, or alternatively, an index may be a normalized value of the resource metric, including statistical analysis (e.g., time-averaged value, dynamic ranges, standard deviations, etc.), for example, or otherwise converting raw values of resource metrics 204 into other index values that may be more readily compared. Further non-limiting examples of computing indices 260 include real-time linear transformations such as rate conversions (e.g., unit costs, currencies, efficiencies, etc.). Additionally, or alternatively, computation of an index may involve reformatting or restructuring resource metrics 204 and/or corresponding data structures to allow more ready comparisons 270, shown below.

Index values, as described above, may additionally represent values or secondary resource metrics not directly available from providers via any interface. For example, an index value may be expressed in terms of a custom service hosted on one of the platforms, such as a computationally intensive service for multimedia transcoding or interactive gaming, in some embodiments. Thus, such index values in this case may represent platform cost per minute of game play, platform cost per hour of transcoded video stream, etc.

Other such index values may be more generalized, but still not available from the originating platform, e.g., continued operating cost per gigaFLOPS, rather than straight cost of occupying a computing node for a unit of time, depending on platform capabilities.

Comparison 270 may include an automated comparison of indices 260, performed by at least one processor 404. In some embodiments, indices 260 for comparison 270 may include indices of comparable resource metrics of a similar cloud-computing resource from one provider versus another provider. For example, a cost-per-FLOPS index of EC2 may be compared with a cost-per-FLOPS index of Azure. In further embodiments, comparison 270 may be across multiple comparable metrics, such as the same corresponding index (for any comparable resource metric) of EC2, Azure, Anthos, Vultr, Linode, DigitalOcean, Heroku, Internap, AliCloud, on-premises infrastructure, etc., to list a few non-limiting examples. A result of comparison 270 may be a maximum or minimum value, for example, or a tuple that may include rank values and/or identifiers of various providers, in some embodiments.

Further with comparison 270, processor 404 may be configured to store results of comparison 270 in memory on a temporary basis, for example. In some embodiments, multiple values of comparison 270 may be logged over time and stored in a database at certain intervals and/or according to certain events or conditions, for example. Thus, comparison 270 may also consider trends of indices 260 and comparisons 270 over time. Comparison 270 may, in some embodiments, account for differential thresholds from one index (corresponding resource metric) to another, e.g., greater than 10% above or below another index for comparison 270.

In some embodiments, indices 260, comparison 270, and/or migration of 280 (below) may involve use of neural networks, AI, or machine learning 250, as described above. Thus, beyond preliminary storage, organization, and processing of data including resource metrics 204, further logic may be employed to generate forecasts or predictions of future parameters of metrics or indices, and/or to generate estimates of current states of various values of resource metrics or corresponding indices, for example.

With respect to machine learning 250, computed indices 260 may serve as inputs, intermediate values, outputs, or any combination thereof, and machine learning 250 may inform any migration 280 (or instruction/recommendation therefor) as described further below. Thus, while FIG. 2 depicts one example of an embodiment, positioning of the machine learning 250 element in FIG. 2 is not intended to limit the machine learning 250 to one aspect of process flow, control flow, or data flow within system 200—rather, machine learning 250 may influence (directly or indirectly) any other component of system 200.

Migration 280 may include effective transfer (or instructions therefor) of computing services based on comparison 270. For example, migration 280 may involve spinning down a service on one platform or infrastructure provider and spinning up essentially the same service on another platform or infrastructure provider (in no particular order), based on the comparison 270. For example, upon determining that a specific provider has availability for improved capacity, cost, performance, efficiency, or another resource metric that is better than a corresponding resource metric of a provider currently in use, processor 404 may be configured to migrate a computing service from the provider currently in use to the specific provider having a better corresponding resource metric.

In some embodiments, migration 280 may involve leaving the service on the same platform or infrastructure provider, but configuring a given computing service on that platform or infrastructure to scale up or down automatically, to improve the underlying resource metric being monitored. The scaling up or down may be targeting a level consistent with a more efficient rate of cost, performance, or efficiency, for example. In some embodiments, in lieu of processor 404 performing or instructing the migration, processor 404 may additionally or alternatively be configured to generate a recommendation for such migration. The recommendation may be made available for subsequent evaluation, which may be automatic or manual, in some embodiments.

In a non-limiting example embodiment of system 200, resources of Anthos and Azure may correspond to resources 202a and 202b. As another resource, EC2 may correspond to resource 202n. Resource metrics 204 may be pulled from any or all of these resources, e.g., via respective APIs, and ingested using Logstash (Elastic Stack) as a data-processing pipeline 210. Kafka may be used as a stream-processing framework 220 for queuing the ingested resource metrics 204 from Logstash, such as via Kafka topics. Using Kafka, the queued resource metrics may be made available to a framework 230, such as Spring Boot, and further to populate a time-series database 240 such as InfluxDB. Machine learning 250 algorithm(s), e.g., including regressions, may be run with indices 260 to generate estimates/predictions for comparison 270. Based on comparison 270, at least one processor 404 may perform migration 280, which may include auto-scaling within a given resource, effectively transferring services between resources, or a combination thereof.

In various embodiments, a cloud services provider system may be representative of a system generally arranged to provide cloud computing services such as, for example, Infrastructure as a Service (IaaS), Platform as a Service (PaaS), Desktop as a Service (DaaS), Software as a Service (SaaS), Storage as a Service (StaaS), Function as a Service (FaaS), Database as a Service (DBaaS), or the like. Additionally, a cloud services provider system may also provide application developers utilizing the client system with tools for accelerated development, deployment, orchestration, and management of their application.

For example, a cloud services provider system may be representative of various data centers of cloud computing services providers (e.g., Microsoft® Azure®, Amazon® Web Services® (AWS®), Google® Compute Engine™, Alibaba® AliCloud®, Digital Ocean®, Vultr®, Linode®, etc.), each implementing a variety of protocols (e.g., Hyper Text Transfer Protocol (HTTP), HTTP Secure (HTTPS), etc.), standard formats (e.g., Representational State Transfer (REST), JavaScript Object Notation (JSON), Extensible markup Language (XML), Remote Procedure Call (RPC), etc.), and/or APIs (e.g., Microsoft® Services Management APIs, Amazon® Elastic Compute Cloud® (EC2®) APIs, Google® Cloud Platform (Anthos®) APIs, etc.). Additionally or alternatively, in some embodiments, a cloud services provider system may be representative of data centers internal or external to a client system's organization configured to provide cloud computing services.

Figure 3A:
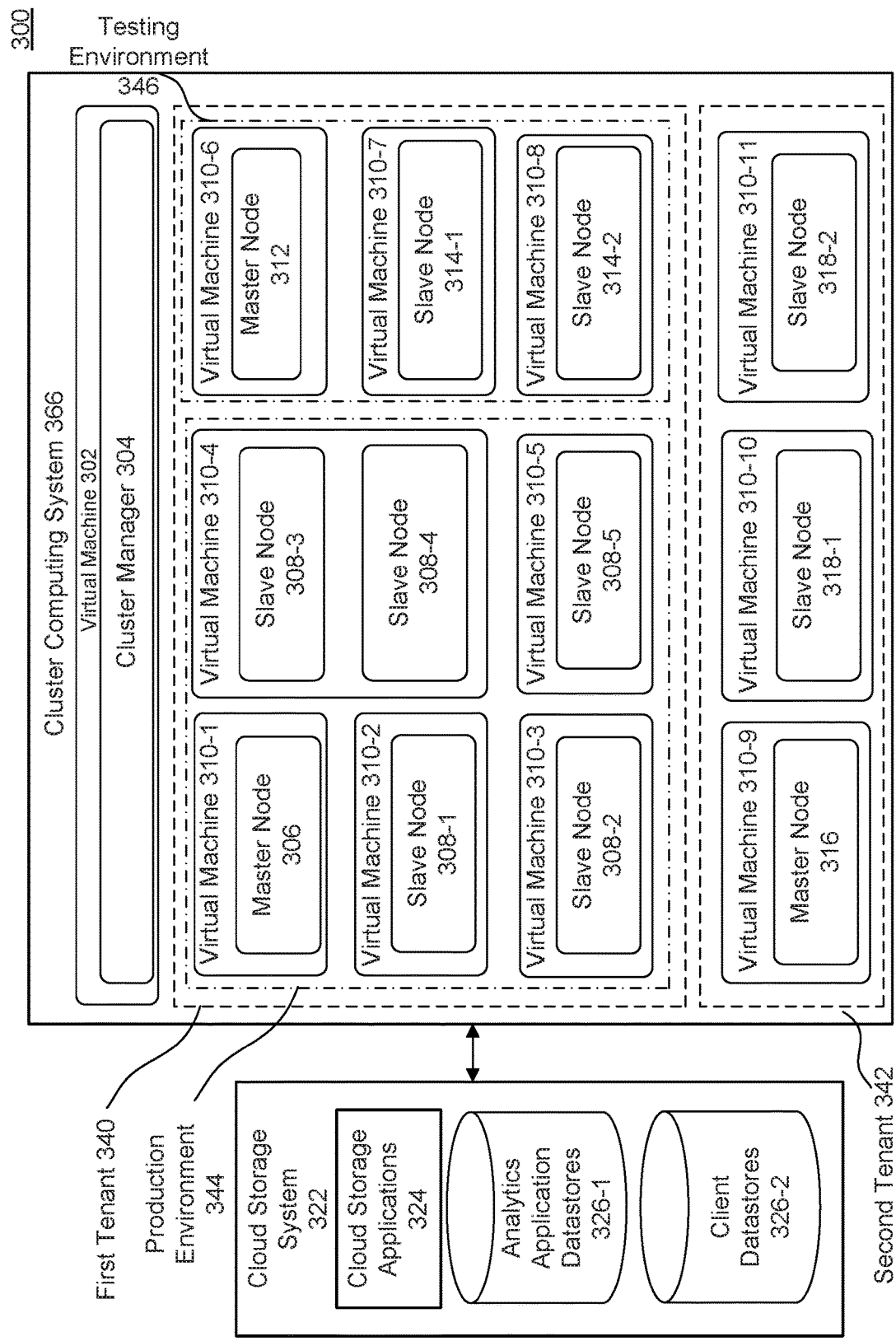
FIG. 3A illustrates a cluster computing system operatively coupled to a cloud storage system, according to an example embodiment.

FIG. 3A illustrates a cluster computing system 366 operatively coupled to the cloud storage system 322, according to an example embodiment.

In one embodiment, the cloud storage system 322 may further include, without limitation, application datastores 326-1 and the client datastores 326-2. Some examples of data stores may include distributed datastores, which may be on-premises or off-premises storage instances, StaaS instances, cloud-based block storage, or cloud-based object storage, for example, including Amazon® Simple Storage Service (S3), Microsoft® Azure® Storage, Minio® Object Storage, IBM® Bluemix® Object Storage, IBM® Cleversafe® Object Storage, Cloudian® HyperStore® or HyperFile®, or the like. In one embodiment, the application datastores 326-1 may be configured to store one or more applications for provisioning by the cluster manager 304. For example, the datastores 326-1 may be configured as a container registry for storing data analytics applications as container application images. In one embodiment, the client datastores 326-2 may store client's data for data analysis by the one or more applications. It is to be appreciated that while the data analytics applications are not illustrated in FIG. 3A, a computing cluster comprising at least one master node (e.g., master node 306) and at least one slave node (e.g., slave nodes 308-1, 308-2, 308-3, 308-4, 308-5) may represent an execution of a data analytics application in the cluster computing system 366 as further discussed below.

In one embodiment, the cluster computing system 366 may include, without limitation, a plurality of cluster nodes (e.g., master nodes 306, 312, 316, slave nodes, 308, 314, 318, etc.) configured to operate as one or more computing clusters. In one embodiment, the cluster computing system 366 may include at least one master node (e.g., master node 306) and at least one slave node (e.g., slave nodes 308-1, 308-2, 308-3, 308-4, 308-5) configured to operate in a master-slave configuration in order to perform data analysis of a client's data (e.g., machine learning training data for machine learning algorithms, scientific data for scientific simulations, financial data for financial analysis, etc.) stored in the client datastores 326-2. In such configurations, the combination of at least one master node and at least one slave node operating in a master-slave configuration may represent a computing cluster executing a data analytics application in a distributed fashion.

In one embodiment, and to facilitate the operation of a computing cluster, the one or more master nodes (e.g., master node, etc.) may be generally configured to manage (e.g., request, terminate, etc.) the execution of computing tasks by one or more slave nodes (e.g., slave node 314-1, 314-2, etc.). The one or more master nodes (e.g., master node, etc.) may also be configured to monitor the operational status of the execution of computing tasks by one or more slave nodes (e.g., slave node 314-1, 314-2, etc.) and may transmit the operational status to the cluster manager 304. The one or more slave nodes may be configured to execute one or more computing tasks on the respective virtual machines (e.g., virtual machines 310-6, 310-7, 310-8, etc.) in parallel. In an embodiment, the computing tasks may include, without limitation, map and reduce tasks, machine learning (ML) tasks (e.g., ML classification tasks, ML clustering, ML regression, ML image classification, ML object recognition tasks), statistical analysis tasks (e.g., distributed R and SAS, etc.), financial analysis tasks, and/or the like. These computing tasks may also be performed on the client's data stored in the client datastores 326-2.

For example, and with respect to a first computing cluster, the master node 306 may be configured to schedule and distribute one or more financial analysis tasks to slave nodes 308-1, 308-2, 308-3, 308-4, and 308-5 for execution in parallel. In another example and with respect to a second computing cluster, the master node 312 may be configured to schedule and distribute one or more map and reduce tasks to slave nodes 314-1 and 314-2 for execution in parallel on client's data stored in the client data stores 326-2. In a further example, the master node 316 may be configured to schedule and distribute ML clustering tasks to slave nodes 318-1 and 318-2 for execution in parallel on client's data stored in the client data stores 326-2.

In one embodiment, and to execute the one or more data analytics applications, the cluster computing system 366 may include one or more virtual machines and 310. In one embodiment, the amount of computing resources (e.g., virtual processors, RAM, maximum network bandwidth, maximum storage, maximum storage bandwidth, etc.) available for each virtual machine may vary based on associated virtual machine (VM) configuration parameters and the underlying hardware that hosts a virtual machine.

For example, the VM configuration parameters may define optimization(s) of the virtual machine (e.g., optimized for general-purpose computing, optimized for accelerated computing, optimized for memory intensive computing, etc.) number of virtual processors (e.g., 1, 2, 4, 6, 8, 16, 24, 32, 64, 128, etc.) available to one or more virtual machines, overall processing bandwidth of one or more virtual machines (e.g., cumulative cycles per second, floating-point operations per second (FLOPS), etc.), the amount of RAM available to the virtual machine(s) (e.g., 16 GB, 32, GB, 64, GB, 128 GB, etc.), maximum network bandwidth available to the virtual machine(s) (e.g., 1, Gbps, 10 Gbps, etc.), amount of storage available to the virtual machine(s) (6 TB, 12, TB, etc.), maximum storage bandwidth available to the virtual machine(s) (e.g., 3,500 Mbps, 7,000 Mbps, 14,000 Mbps, etc.), operating system(s) of the virtual machine(s) (e.g., Microsoft® Windows® Server, Canonical® Ubuntu® Server, Debian® Linux®, CentOS® Linux®, IBM® Red Hat® Linux®, CoreOS® Container Linux® (rkt), Amazon® Linux® (Amazon® Machine Image), FreeBSD®, Intel® Clear Linux®, Microsoft® Azure® Sphere®, etc.), geographic region of the virtual machine (e.g., Northern Virginia, Ohio, Northern California, Montreal, Ireland, Frankfurt, Singapore, etc.), and/or the like.

In one embodiment, and to manage one or more computing clusters executing on one or more virtual machines 310, virtual machine may be associated with and managed by a cloud computing services provider of the cloud services provider system. The virtual machine may include, without limitation, a cluster manager 304 which may also be managed by the cloud computing services provider. In one embodiment, the cluster manager 304 may be configured to establish communication sessions with one or more systems and applications to perform one or more management operations with one or more computing clusters as further discussed below.

In one embodiment, the cluster manager 304 may be generally configured to provision a data analytics application stored in the analytics application datastores 326-1 as one or more computing clusters for execution on the one or more virtual machines 310. In one embodiment, the cluster manager 304 may be configured to provision the data analytics application based on one or more cluster provisioning requests received from one or more systems and/or applications via the established communication session. Each provisioned computing cluster may be identified by a cloud computing cluster identifier, which may be a unique alpha numeric identifier among all other computing clusters and may be assigned by the cloud computing services provider of cloud services provider system. In one embodiment, the cluster manager 304 may include a combination of hardware (e.g., physical processors, memory, application specific integrated circuit (ASIC), field programmable gate array (FPGA)) and/or executable software (e.g., executable code, interpreted code, managed code, library code, etc.).

In one embodiment, the cluster provisioning requests may include one or more cluster creation parameters. The one or more cluster creation parameters, may include, without limitation, the size of the computing cluster (e.g., a number nodes), the type of data analytics application to execute (e.g., Apache® Hadoop®, Sector Alliance™ Sector/Sphere™, Zvents® Hypertable, Apache® Spark®, etc.), and the one or more virtual machine configuration parameters (e.g., number of virtual processors, amount of RAM, amount of storage, amount of network bandwidth, etc.). To further assist client system in identifying one or more computing clusters, the one or more cluster creation parameters may further include, without limitation, a client assigned computing resource identifier and client assigned computing resource name. The client assigned computing resource identifier may be a unique alpha numeric identifier and may identify one or more computing resources used by one or more users and/or teams of the client system. The client assigned computing resource name may provide a descriptive name for the one or more computing resources.

For example, a cluster provisioning request to provision the first computing cluster may specify a first client assigned computing resource identifier to be assigned to the first computing cluster (e.g., master node 306 and slave nodes 308-1, 308-2, 308-3, 308-4, 308-5, etc.) and a first client assigned computing resource name also to be assigned to the first computing cluster. Similarly, a cluster provisioning request to provision the second computing cluster may specify a second client assigned computing resource identifier to be assigned to the second computing cluster (e.g., master node 312 and slave nodes 314-1, 314-2, etc.) and specify a second client assigned computing resource name also to be assigned to the first computing cluster.

In one embodiment, and continuing with the example, the first client assigned computing resource identifier and the second client assigned computing resource identifier may also be the same when the same user or team of the client system are responsible for both the first and second computing clusters or different if first and second computing clusters may be managed by different users or teams of the client system. In one embodiment, the first client assigned computing resource name and the second client assigned computing resource name may also be the same or different depending on circumstances and implementation.

In one embodiment, the cluster manager 304 may also be configured to maintain, determine, and provide operational status of the one or more computing clusters. In one embodiment, and to provide operational status, the cluster manager 304 may also be configured to receive one or more resource search requests to identify one or more computing resources of the cluster computing system 366 associated with a user and/team of a client system. In one embodiment, the cluster manager 304 may be configured to transmit a resource search response identifying one or more computing resources to one or more systems and/or applications based on the received resource search request and resource attribute scan parameters. Some implementations of cluster manager 304 may include a message-passing interface (MPI) or equivalent, distributed interprocess communication (DIPC) protocol, single-system image (SSI) architecture, virtual-kernel architecture, load balancer, distributed manager for storage or memory in clustered computing applications, and/or other cluster middleware, according to some embodiments. Further examples of cluster manager 304 may include Slurm™ Workload Manager, OpenSSI, LinuxPMI/openMosix, Kerrighed™, gLite™, Apache® Mesos®, Apache® Spark® framework, or the like, which may include executable code, interpreted code, managed code, library code, etc., as described further below.

In one embodiment, and to ensure there are adequate computing resources allocated during provisioning of one or more computing clusters, the cluster manager 304 may be configured to transmit one or more virtual machine (VM) provisioning request to the scalable computing system 304. The VM provisioning request may request the scalable computing system 304 to provision one or more virtual machines 310 based on the one or more cluster provisioning requests. The cluster manager 304 may be further configured to terminate the execution of one or more computing clusters based on a cloud computing command request received from one or more systems and/or applications via an established communication session. Additionally, and based on the cloud computing command request, the cluster manager 304 may also generate and transmit one or more VM termination requests to the VM manager 384 to request one or more virtual machines that are no longer used any master node or slave node of a computing cluster.

In one embodiment, and to reduce possibilities of cross contamination between a client's data and its computing resources used during testing or quality assurance versus the client's data and its computing resources used during production, the one or more cluster creation parameters may further include, without limitation, a client assigned environment identifier that identifies the development environment associated with the computing cluster used by the client system. In one embodiment, the client assigned environment identifier may identify whether a computing cluster used by the client system is part of a testing environment 346 or a production environment 344.

For example, and with respect to the first computing cluster as previously discussed, the first computing cluster, which includes the master node 306 and slave nodes 308-1, 308-2, 308-3, 308-4, and 308-5, may be identified as being part of the production environment 344. In another example, and with respect to the second computing cluster as previously discussed, the second computing cluster, which includes the master node 312 and slave nodes 314-1 and 314-2, may be identified as being part of the testing environment 344.

In one embodiment, the cloud services provider system may be configured to operate utilizing a multi-tenant architecture. In one embodiment, one or more the computing resources (e.g., computing clusters, virtual machines, virtual processors, RAM, local storage, etc.) of the cluster computing system 366 may be shared between multiple tenants. In one example, cluster computing system 366 may be divided between a first tenant 340 that is utilized by users of client system and a second tenant 342 that is utilized by different users of different client system (not shown), where at least some of the underlying hardware and/or software may be shared (e.g., sharing of physical server devices, sharing of a physical processor with multiple physical cores, sharing total RAM, etc.). It is to be appreciated, however, that despite sharing one or more computing resources, a tenant's or a client's data stored in client datastores 326-1 is typically isolated from other tenants or clients.

Figure 3B:
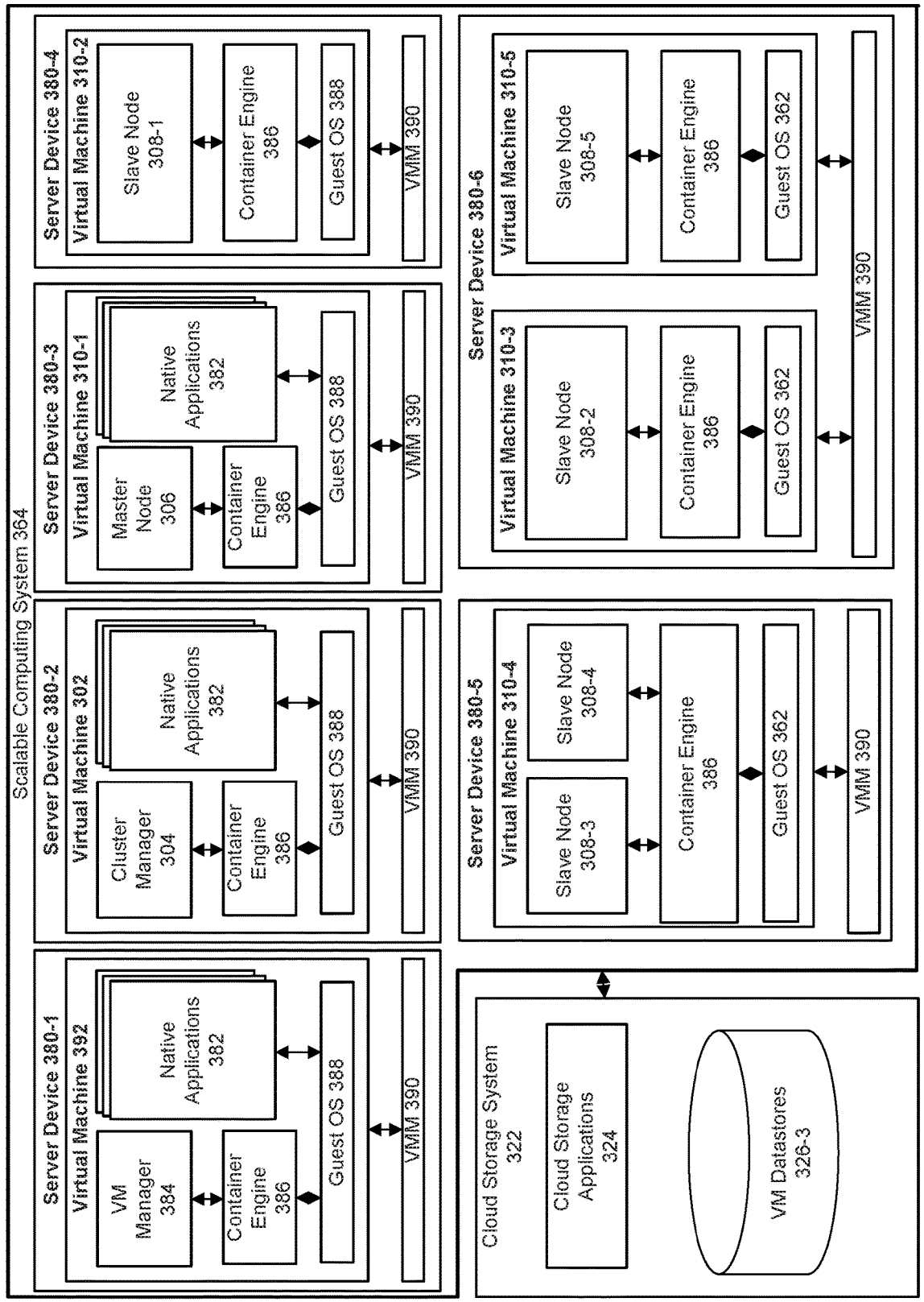
FIG. 3B illustrates server devices of a scalable computing system configured to host one or more virtual machines, according to an example embodiment.

FIG. 3B illustrates server devices 380 of the scalable computing system 366 configured to host one or more virtual machines 392, and 310 according to an example embodiment.

As previously illustrated and discussed in FIG. 3A, one or more master nodes and slave nodes of one or more computing clusters may be provisioned to one or more virtual machines 310 for execution. Also previously illustrated in FIG. 3A, the cluster manager 304, which may be configured to provision one or more master nodes and slave nodes to the virtual machines 310, may itself be hosted in a virtual machine (e.g., virtual machine). In one embodiment, the cloud storage system 322 may further include, without limitation, virtual machine (VM) datastores 326-3 configured to store virtual machine images with associated virtual machine configuration parameters.

In one embodiment, to provide virtual machines and 310 with physical hardware for execution of their applications, the scalable computing system 304 may include, without limitation, one or more server devices 380. In one embodiment, each of the server devices 380 of the scalable computing system 304 may also vary based on their available computing resources (e.g., number of physical processors, amount of RAM, maximum amount of storage, maximum amount of network bandwidth, etc.). For example, one or more server devices 380 may be configured for specific hardware optimizations (e.g., optimized for general purpose computing, optimized for accelerated computing, optimized for memory intensive computing, etc.) and may vary by number of physical processors (e.g., 1, 2, 4, 6, 8, 16, 24, 32, 64, 128, etc.), overall processing bandwidth of one or more processors (e.g., cumulative cycles per second, floating-point operations per second (FLOPS), etc.), the amount of installed RAM (e.g., 16 GB, 32, GB, 64, GB, 128 GB, etc.), vary by the maximum network bandwidth available (e.g., 1, Gbps, 10 Gbps, etc.), the amount of storage installed (6 TB, 12, TB, etc.), the maximum storage bandwidth available (e.g., 3,500 Mbps, 7,000 Mbps, 14,000 Mbps, etc.), and/or the like.

In one embodiment, the server devices 380 may be geographically separated (e.g., separate physical locations, etc.) and virtually separated (e.g., separate network domains, etc.). In other embodiments, the server devices 380 may be substantially geographically co-located (e.g., in substantially the same physical location, etc.) and virtually connected (e.g., in the same network domain, etc.). Alternatively, in some embodiments, the server devices 380 may be geographically separated yet virtually connected or substantially geographically co-located yet virtually separated. For example, the server device 380-1 may be physically located in one geographic region separate from the server device 380-2, 380-3, 380-4, 380-5, and 380-6, yet virtually connected. In one embodiment, the availability of server devices 380 and their associated computing resources may vary based on the geographic region. For example, availability of server devices 380 configured to handle memory-intensive computing with 64 physical processors and 128 GB of RAM may be limited in Northern Virginia and as compared to Northern California. Other performance measures, including latency and cost, may also be considered.

In one embodiment, each of the server devices 380 of the scalable computing system 304 may be configured to include, without limitation, a hypervisor or virtual machine monitor (VMM) (e.g., VMM 390 of server device 380-1). In one embodiment, the VMMs 390 may be configured to execute directly on the server devices (e.g., server devices 380) and manage the concurrent execution of one or more virtual machines 392, and 310 (e.g., virtual machine 310-3 virtual 310-5 of server device 380-6). For example, VMM 390 of server device 380-1 may be representative of a native or bare-metal hypervisor (e.g., VMware® ESXi™ hypervisor, Microsoft® Hyper-V® hypervisor, KVM hypervisor, Proxmox™ VE hypervisor, Citrix® XenServer® Xen™ hypervisor, etc.) configured to execute and/or manage one or more instances of virtual machines 392, and/or 310, for example. Additionally, or alternatively, hosted VMMs may be run on a native host operating system. With sufficient hardware virtualization support (e.g., AMD® AMD-V, AMD-Vi, AMD-RVI; Intel® VT-x, VT-i, VT-d; ARM® Virtualization Extensions, System Memory Management Unit (SMMU), TrustZone®; Samsung® Exynos® Sys-MMU; Sun® Input-Output Memory Management Unit (IOMMU); other IOMMU, SMMU, or equivalent virtualization-extensions architecture, etc.) underlying the host operating system, hosted VMMs may run one or more virtual machines 392, and/or 310 with native or near-native performance. Examples of hosted VMMs include VMware® Server, Oracle® VirtualBox®, Oracle® Virtual Iron™, BSD® Hypervisor (bhyve™), QEMU™, etc.

In one embodiment, the one or more virtual machines 392, and 310 may include, without limitation, a guest operating system (OS) 388 (e.g., Microsoft® Windows® Server, Canonical® Ubuntu® Server, Debian® Linux®, CentOS® Linux®, IBM® Red Hat® Linux®, CoreOS® Container Linux®, Amazon® Linux® (Amazon® Machine Image), FreeBSD®, Intel® Clear Linux®, Microsoft® Azure® Sphere®, etc.). In one embodiment, each guest OS may be generally configured to execute one or more native applications 382 and one or more container engines 386 (e.g., Docker® Engine, rkt, LXC™ (including Anbox™), Oracle® Solaris® Zones, FreeBSD® Jails, Linux® cgroups, IBM® AIX® Workload Partitions, Virtuozzo® OpenVZ®, etc.). Containers may refer generically to any software-level or OS-level virtualization or paravirtualization, in some embodiments. In one embodiment, the native applications 382 of may be configured to assist in the execution of the master nodes and/or slave nodes in container engines 386 of the one or more guest OS 388. In some embodiments, master and/or slave nodes may form a part of a distributed software and/or storage framework, such as Apache® Hadoop®, Amazon® Elastic MapReduce, or similar software ecosystems that may be based at least in part on a MapReduce programming model, and that may be hosted in at least one virtual machine, such as virtual machines 310-1 through 310-5, for example. In one embodiment, the native applications 382 may also share a common execution environment with a container engine in a guest OS 388.

In one embodiment, each of the one or more container engines 386 may be configured to host and manage the execution of one or more container applications such as, the cluster manager 304, one or more master nodes (e.g., master node 306 hosted of virtual machine 310-1), and/or one or more slave nodes (e.g., slave nodes 308-3 and 308-4 of virtual machine 310-4). It is to be appreciated that in some implementations, the one or more master nodes and slave nodes may be executed by the container engine 386 in one or more container instances, where each container instance (not shown) may execute the master nodes and/or slave nodes in its own isolated runtime environment. Thus, each container instance may include, without limitation, a container operating system (OS), one or more container applications associated with the master nodes and/or slave nodes, and associated container components (e.g., executable binaries, support libraries, etc.) to support the execution of the master nodes and slave nodes.

In one embodiment, and to assist in the management of one or more virtual machines 310 executing on one or more server devices 380 (e.g., server devices 380-3, 380-4, 380-5, 380-6, etc.), the server device 380-1 may include virtual machine 392 may be managed by the cloud computing services provider of the cloud services provider system. In one embodiment, the virtual machine 392 may include a virtual machine (VM) manager 384 configured to provision virtual machines based on one or more virtual machine (VM) provisioning requests received from one or more systems and/or applications (e.g., client manager 304, serverless manager 332, etc.). In one embodiment, a VM provisioning request may include one or more VM provisioning parameters. The one or more VM provisioning parameters may include, without limitation, a number of virtual machines to provision and the VM configuration parameters as previously discussed with respect to FIG. 3A for each virtual machine.

In one embodiment, and in response to the VM provisioning request, the VM manager 384 may be configured to identify one or more server devices 380 with available computing resources that can match or otherwise satisfy the VM provisioning request. After identifying one or more available server devices 380, the VM manager 384 may be further configured to provision one or more virtual machines 380 having the VM configuration parameters specified in the VM provision request to the available one or more available server devices 380. Each of the provisioned virtual machines 380 may be identified by a cloud VM identifier, which may be a unique alpha numeric identifier among all other cloud VM identifiers and may be assigned by the cloud computing services provider of cloud services provider system.

For example, and to provision the one or more virtual machines 380, the VM manager 384 may identify and/or configure one or more VM images stored in the VM datastores 326-3 with the specified VM configuration parameters. Continuing with the example, the VM manager 384 may further transmit or cause the transmission of the identified and/or configured one or more VM images to VMMs 390 of the identified one or more server devices 380 with available computing resources. It is to be appreciated that each of the identified and/or configured VM images may be appropriately matched with the computing resources available of the identified one or more server devices 380. Continuing with the example, the VM manager 384 may then configure and/or request the execution of the VM images on the identified one or more server devices 380 by the respective VMMs 390s.

In one embodiment, the VM manager 384 may be further configured to transmit a VM provisioning response to each of the systems and/or applications that transmitted a VM provisioning request. The VM provisioning response may include, without limitation, one or more cloud VM identifiers assigned to each provisioned virtual machine. In one embodiment, the VM manager 384 may also be configured to receive VM termination requests from the one or more systems and/or applications, which may include the one or more cloud VM identifiers. Thus, the cloud VM identifiers may be used by the systems and/or applications to terminate a previously provisioned virtual machines so as to free up any computing resources (e.g., physical processors, RAM, of the server devices) used by the identified virtual machines to be terminated. In one embodiment, the VM manager 384 may include a combination of hardware (e.g., physical processors, memory, application specific integrated circuit (ASIC), field programmable gate array (FPGA)) and/or executable software (e.g., executable code, interpreted code, managed code, library code, etc.)

Examples of VM manager 384 may include Apache® CloudStack®, IBM® Red Hat® Virtual Machine Manager (virt-manager)™, IBM® Red Hat® libvirt™, Kimchi Project™ Kimchi, TotalCloud®, Citrix® GoTo Cloud Services®, etc. Additionally or alternatively, software for orchestration of containers or virtual machines may fulfill the role of VM manager 384. Further examples of VM manager 384 in an orchestration role may include Spotinst™ Elastigroup™, Google® Kubernetes®, Google® Ganeti®, Docker® Swarm®, IBM® Red Hat® oVirt®, Proxmox™ Virtual Environment (VE), OpenQRM™, Microsoft® System Center Virtual Machine Manager (SCVMM), IBM® Red Hat® OpenShift®, Amazon® Elastic Container Service (ECS), etc.

Figure 3C:
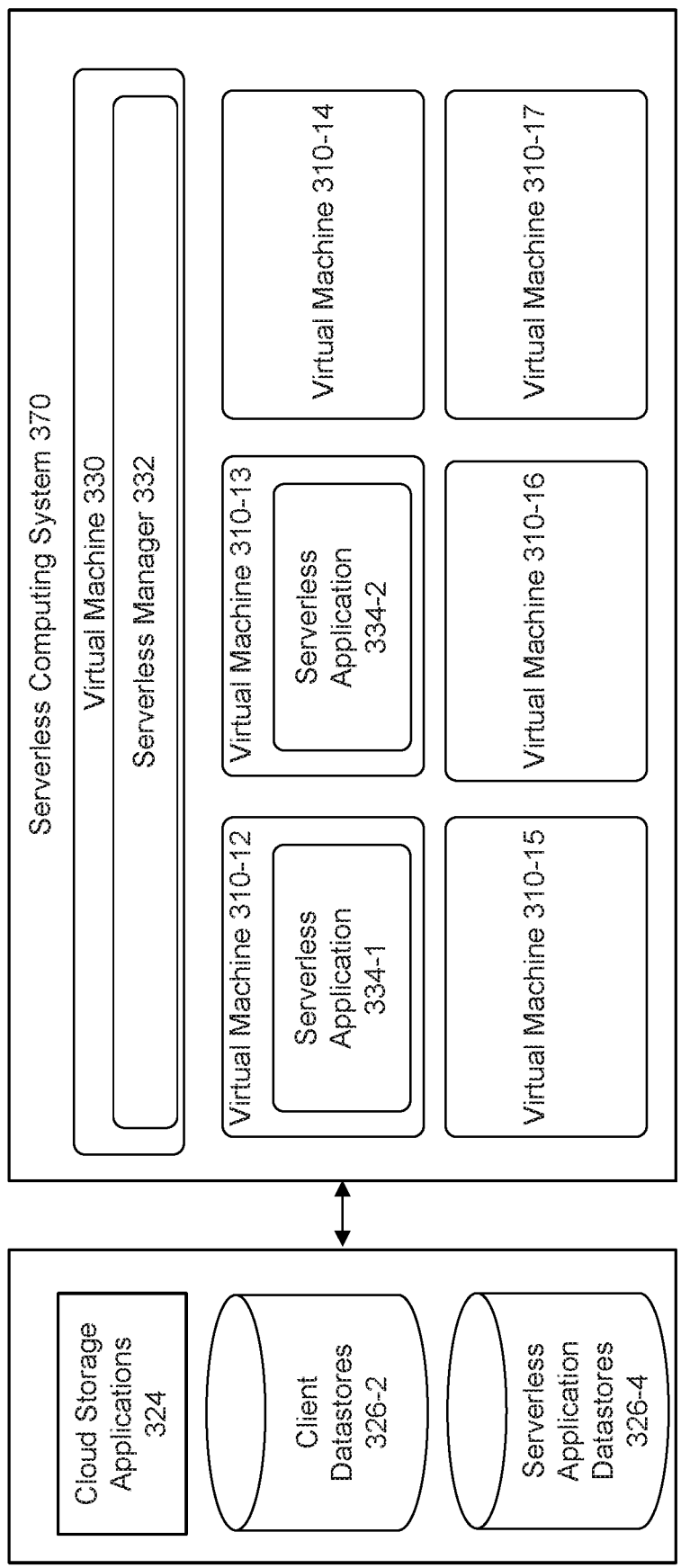
FIG. 3C illustrates the components of a serverless computing system, according to an example embodiment.

FIG. 3C illustrates a serverless computing system 370 operatively coupled to the cloud storage system 322 for monitoring long standing resources according to an example embodiment.

In one embodiment, the cloud storage system 322 may further include, without limitation, the data analytics application datastores 326-1 and the client datastores 326-2 and serverless application datastores 326-4. In one embodiment, client datastores 326-2 may be further configured to store configuration information for configuring the operations of the configurable resource monitor application 312. In one embodiment, the serverless application datastores 326 may be further configured to store one or more serverless applications 334. The serverless applications 334 may include, without limitation, configurable resource monitor application. Each serverless application may be configured with at least one monitor component specifically configured to receive and process one or more notifications (e.g., cloud monitoring notifications, etc.) received by the serverless computing system 370.

In one embodiment, and to assist in the management and communication of one or more serverless applications 334 executing on one or more virtual machines 310, virtual machine 330 may be associated with and managed by a cloud computing services provider of the cloud services provider system. The virtual machine may include, without limitation, a serverless manager 332. In one embodiment, the serverless manager 332 may be configured to provision one or more serverless applications 334 to one or more virtual machines 310. In one embodiment, the serverless manager 332 may be provisioned on an on-demand basis or before receiving any notification to be processed by a serverless application. For example, the serverless manager 332 may be configured to provision a serverless application 334-1 upon immediate receipt of a notification to be processed by a serverless application 334-1.

For example, and to provision the one or more serverless applications, the serverless manager 332 may identify and/or configure a serverless application container stored in the serverless application datastores 326-4 and configured to process the received notification. Continuing with the example, the serverless manager 332 may further transmit or cause the transmission of the identified and/or configured serverless application containers for execution by a virtual machine 310. Each provisioned serverless application may be identified by a serverless application identifier, which may be a unique alpha numeric identifier among all other serverless applications and may be assigned by the cloud computing services provider of cloud services provider system.

In one embodiment, and after the serverless application has been provisioned, the serverless manager 332 may pre-process and/or forward the notification to be further processed to an appropriate serverless application 334. Additionally, one or more subsequent requests and responses received and transmitted by a serverless application may also be forwarded and/or processed by the VM manager 384 before it is transmitted to another system and/or application or received by the appropriate serverless application 334. Example software stacks for serverless computing may include Amazon® AWS Lambda, Serverless® Application Framework, Oracle® Cloud® Fn™, Google® Anthos® Cloud Functions, Microsoft® Azure® Functions, IBM® Bluemix®, or other instances of FaaS or SaaS.

In one embodiment, and to manage increase in demands to process, in real-time, one or more notifications, the serverless manager 332 may be further configured to provision additional serverless applications configured to process these notifications. In one embodiment and to ensure there are adequate computing resources allocated during provisioning of one or more serverless applications, the cluster manager 304 may be further configured to transmit one or more virtual machine (VM) provisioning request the scalable computing system 304 to provision one or more virtual machines 310 based on the one or more notifications and available virtual machines to execute the serverless applications. In one embodiment, the serverless manager 332 may include a combination of hardware (e.g., physical processors, memory, application specific integrated circuit (ASIC), field programmable gate array (FPGA)) and/or executable software (e.g., executable code, interpreted code, managed code, library code, etc.)

It is to be appreciated that unlike computing resources (e.g., computing clusters, virtual machines, etc.) of the cluster computing system 366, a serverless application may be automatically terminated by the serverless manager 332, as soon as any operations associated with a notification has been appropriately processed by the serverless application.

Figure 3D:
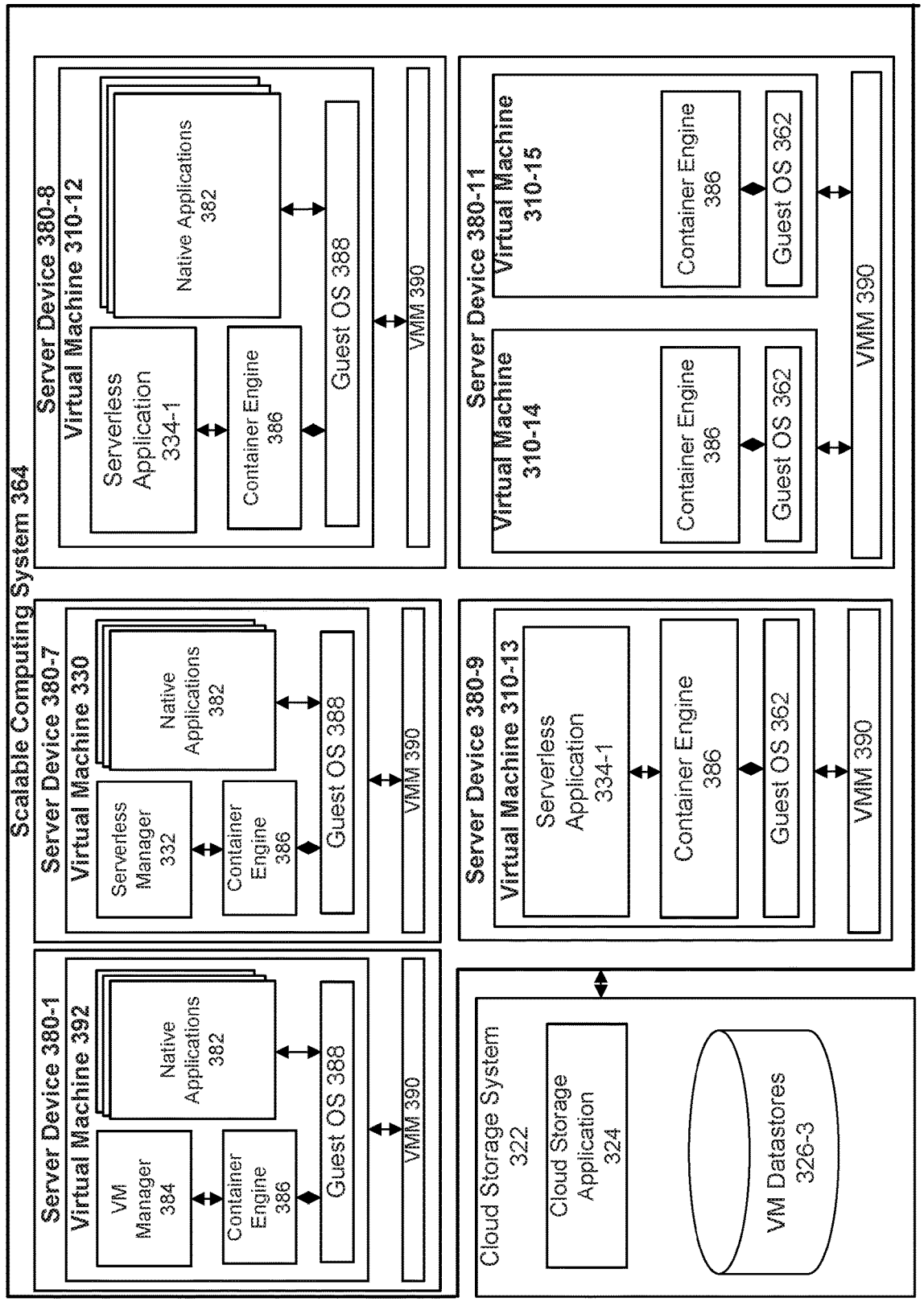
FIG. 3D illustrates server devices and virtual machines of a serverless computing system, according to an example embodiment.

FIG. 3D illustrates server devices 380 of the scalable computing system 304 configured to host one or more virtual machines 392, and 310 according to an example embodiment. It is to be appreciated that because the scalable computing system 304 has been discussed with respect to FIG. 3B, the following discussion will be focused primarily on any differences not discussed in FIG. 3B.

As previously illustrated and discussed in FIG. 3B, the scalable computing system 304 may be include a plurality of server devices 310 executing virtual machines 330 and 310. Also as previously illustrated and discussed in FIG. 3B, the virtual machines 310 may be further configured to execute container engines 386. The container engines 386 may be further configured to execute serverless applications as one or more container applications. In one embodiment, the native applications 382 may also be configured to assist in the execution of serverless applications of the one or more guest OS 388.

The following example computer system, or multiple instances thereof, may be used to implement method 100, system 200, or any component thereof, according to some embodiments.

Figure 4:
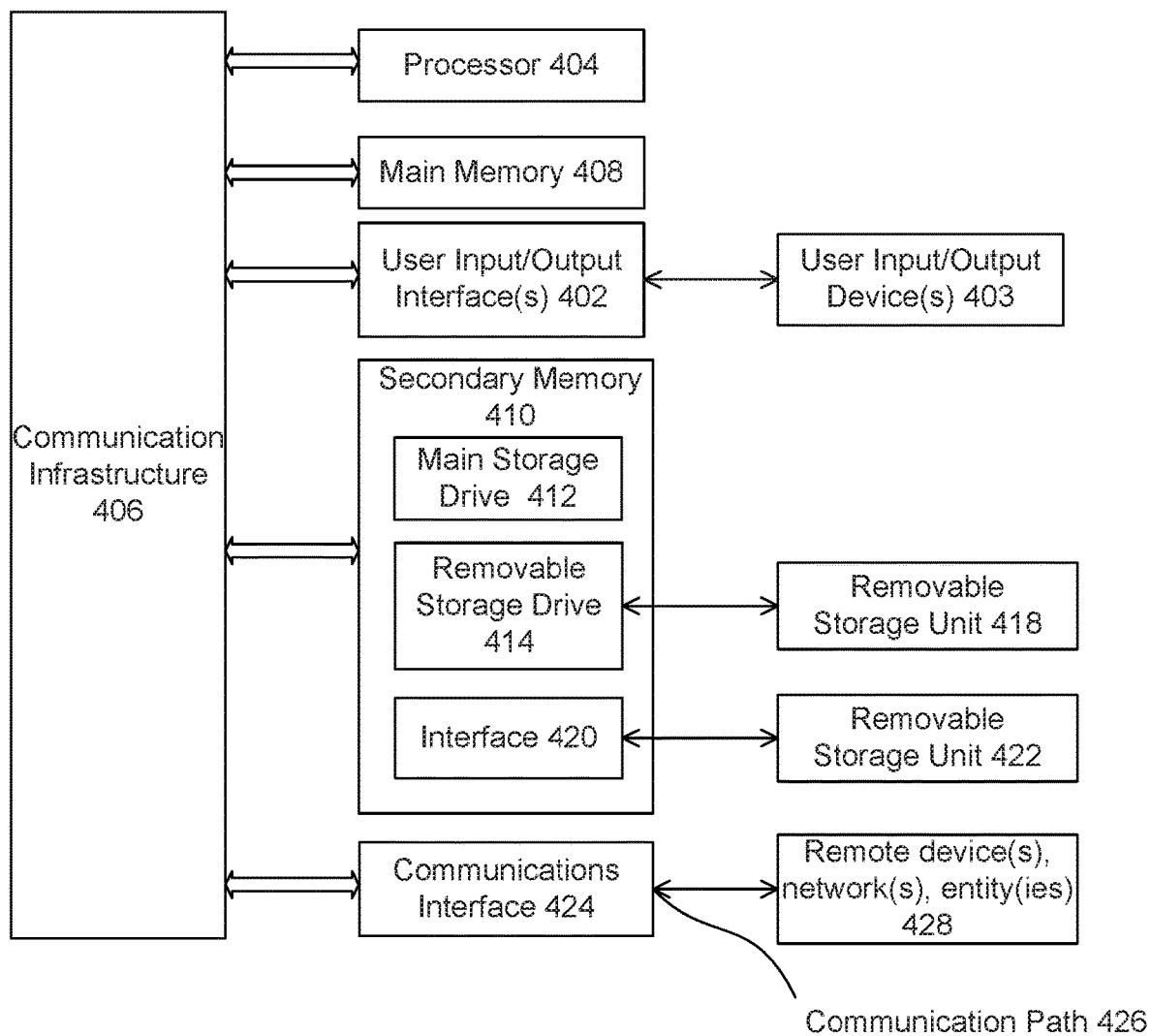
FIG. 4 is an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a bus or communication infrastructure 406.

Computer system 400 may also include user input/output device(s) 404, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, vector processing, array processing, etc., as well as cryptography, including brute-force cracking, generating cryptographic hashes or hash sequences, solving partial hash-inversion problems, and/or producing results of other proof-of-work computations for some blockchain-based applications, for example.

Additionally, one or more of processors 404 may include a coprocessor or other implementation of logic for accelerating cryptographic calculations or other specialized mathematical functions, including hardware-accelerated cryptographic coprocessors. Such accelerated processors may further include instruction set(s) for acceleration using coprocessors and/or other logic to facilitate such acceleration.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or secondary memory 410. Secondary memory 410 may include, for example, a main storage drive 412 and/or a removable storage device or drive 414. Main storage drive 412 may be a hard disk drive or solid-state drive, for example. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/ any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communication path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet of Things (IoT), and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software (e.g., "on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), database as a service (DBaaS), etc.); and/or a hybrid model including any combination of the foregoing examples or other services or delivery paradigms.

Any applicable data structures, file formats, and schemas may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

Any pertinent data, files, and/or databases may be stored, retrieved, accessed, and/or transmitted in human-readable formats such as numeric, textual, graphic, or multimedia formats, further including various types of markup language, among other possible formats. Alternatively or in combination with the above formats, the data, files, and/or databases may be stored, retrieved, accessed, and/or transmitted in binary, encoded, compressed, and/or encrypted formats, or any other machine-readable formats.

Interfacing or interconnection among various systems and layers may employ any number of mechanisms, such as any number of protocols, programmatic frameworks, floorplans, or application programming interfaces (API), including but not limited to Document Object Model (DOM), Discovery Service (DS), NSUserDefaults, Web Services Description Language (WSDL), Message Exchange Pattern (MEP), Web Distributed Data Exchange (WDDX), Web Hypertext Application Technology Working Group (WHATWG) HTML5 Web Messaging, Representational State Transfer (REST or RESTful web services), Extensible User Interface Protocol (XUP), Simple Object Access Protocol (SOAP), XML Schema Definition (XSD), XML Remote Procedure Call (XML-RPC), or any other mechanisms, open or proprietary, that may achieve similar functionality and results.

Such interfacing or interconnection may also make use of uniform resource identifiers (URI), which may further include uniform resource locators (URL) or uniform resource names (URN). Other forms of uniform and/or unique identifiers, locators, or names may be used, either exclusively or in combination with forms such as those set forth above.

Any of the above protocols or APIs may interface with or be implemented in any programming language, procedural, functional, or object-oriented, and may be compiled or interpreted. Non-limiting examples include C, C++, C #, Objective-C, Java, Swift, Go, Ruby, Perl, Python, JavaScript, WebAssembly, or virtually any other language, with any other libraries or schemas, in any kind of framework, runtime environment, virtual machine, interpreter, stack, engine, or similar mechanism, including but not limited to Node.js, V8, Knockout, jQuery, Dojo, Dijit, OpenUI5, AngularJS, Express.js, Backbone.js, Ember.js, DHTMLX, Vue, React, Electron, and so on, among many other non-limiting examples.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments may operate with software, hardware, and/or operating system implementations other than those described herein.

It is to be appreciated that the Detailed Description section, and not any other section, is intended to be used to interpret the claims. Other sections may set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships (or equivalents thereof) are appropriately performed. Also, alternative embodiments may perform functional blocks, steps, operations, methods, etc. using orderings different from those described herein.

References herein to "one embodiment," "an embodiment," "an example embodiment," "some embodiments," or similar phrases, indicate that the embodiment described may include a particular feature, structure, or characteristic, but every embodiment may not necessarily include the particular feature, structure, or characteristic. Moreover, such phrases are not necessarily referring to the same embodiment.

Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method, comprising:
retrieving, by at least one computer processor, via an application programming interface (API), a plurality of resource metrics,
   wherein the plurality of resource metrics comprise a first set of resource metrics and a second set of resource metrics,
   wherein the first set of resource metrics corresponds to a first resource, and
   wherein the second set of resource metrics corresponds to a second resource;
ingesting, by the at least one computer processor, via a data-processing pipeline, the plurality of resource metrics;
queuing, by the at least one computer processor, via a stream-processing platform, the plurality of resource metrics;

selecting, by the at least one computer processor, via an application framework, at least the first set of resource metrics and second set of resource metrics;

populating, by the at least one computer processor, a time-series database with data comprising the first set of resource metrics and second set of resource metrics;

computing, by the at least one computer processor, for a first value corresponding to the first resource and a second value corresponding to the second resource, a first index corresponding to the first value and a second index corresponding to the second value, wherein the first index is normalized via an analysis of the first value with respect to time; and wherein the computing is carried out using at least one machine-learning algorithm executed by the at least one computer processor;

performing, by the at least one computer processor, an automated comparison of at least the first index and the second index; and migrating, by the at least one computer processor, a computing service from at least one of the first resource or the second resource, based on the automated comparison.

2. The computer-implemented method of claim 1, the migrating further comprising:
transferring, by the at least one computer processor, the computing service from the first resource to the second resource.

3. The computer-implemented method of claim 1, the migrating further comprising:
transferring, by the at least one computer processor, the computing service from the first resource or the second resource to a third resource, wherein the third resource is a cloud-computing platform.

4. The computer-implemented method of claim 1, wherein the first index comprises an estimate of a current state of the first value for a given resource metric corresponding to the first resource, based at least in part on the first set of resource metrics.

5. The computer-implemented method of claim 4, wherein the first value is a rate of change of the given resource metric.

6. The computer-implemented method of claim 1, wherein the first index comprises a prediction of a future parameter of a given resource metric corresponding to the first resource, based at least in part on the first set of resource metrics.

7. The computer-implemented method of claim 1, wherein the machine-learning algorithm comprises a regression algorithm.

8. A system, comprising memory and at least one computer processor configured to perform operations comprising:

retrieving, via an application programming interface (API), a plurality of resource metrics,
wherein the plurality of resource metrics comprise a first set of resource metrics and a second set of resource metrics,
wherein the first set of resource metrics corresponds to a first resource, and
wherein the second set of resource metrics corresponds to a second resource;

ingesting, via a data-processing pipeline, the plurality of resource metrics;

queuing, via a stream-processing platform, the plurality of resource metrics;

selecting, via an application framework, at least the first set of resource metrics and second set of resource metrics;

populating a time-series database with data comprising the first set of resource metrics and second set of resource metrics;

computing, for a first value corresponding to the first resource and a second value corresponding to the second resource, a first index corresponding to the first value and a second index corresponding to the second value, wherein the first index is normalized via an analysis of the first value with respect to time; and wherein the computing is carried out using at least one machine-learning algorithm executed by the at least one computer processor;

performing an automated comparison of at least the first index and the second index; and migrating a computing service from at least one of the first resource or the second resource, based on the automated comparison.

9. The system of claim 8, the migrating further comprising:
transferring the computing service from the first resource to the second resource.

10. The system of claim 8, the migrating further comprising:
transferring the computing service from the first resource or the second resource to a third resource, wherein the third resource is a cloud-computing platform.

11. The system of claim 8, wherein the first index comprises an estimate of a current state of the first value for a given resource metric corresponding to the first resource, based at least in part on the first set of resource metrics.

12. The system of claim of claim 11, wherein the first value is a rate of change of the given resource metric.

13. The system of claim 8, wherein the first index comprises a prediction of a future parameter of a given resource metric corresponding to the first resource, based at least in part on the first set of resource metrics.

14. The system of claim 8, wherein the machine-learning algorithm comprises a regression algorithm.

15. A non-transitory computer-readable storage medium comprising instructions stored thereon that, when executed by at least one computer processor, cause the at least one computer processor to perform operations comprising:

retrieving, via an application programming interface (API), a plurality of resource metrics,
wherein the plurality of resource metrics comprise a first set of resource metrics and a second set of resource metrics,
wherein the first set of resource metrics corresponds to a first resource, and
wherein the second set of resource metrics corresponds to a second resource;

ingesting, via a data-processing pipeline, the plurality of resource metrics;

queuing, via a stream-processing platform, the plurality of resource metrics;

selecting, via an application framework, at least the first set of resource metrics and second set of resource metrics;

populating a time-series database with data comprising the first set of resource metrics and second set of resource metrics;

computing, for a first value corresponding to the first resource and a second value corresponding to the second resource, a first index corresponding to the first value and a second index corresponding to the second value, wherein the first index is normalized via an analysis of the first value with respect to time; and wherein the computing is carried out using at least one machine-learning algorithm executed by the at least one computer processor;

performing an automated comparison of at least the first index and the second index; and migrating a computing service from at least one of the first resource or the second resource, based on the automated comparison.

16. The non-transitory computer-readable storage medium of claim 15, the migrating further comprising:

transferring the computing service from the first resource to the second resource.

17. The non-transitory computer-readable storage medium of claim 15, the migrating further comprising:

transferring the computing service from the first resource or the second resource to a third resource, wherein the third resource is a cloud-computing platform.

18. The non-transitory computer-readable storage medium of claim 15, wherein the first index comprises an estimate of a current state of the first value for a given resource metric corresponding to the first resource, based at least in part on the first set of resource metrics, wherein the first value is a rate of change of the given resource metric.

19. The non-transitory computer-readable storage medium of claim 15, wherein the first index comprises a prediction of a future parameter of a given resource metric corresponding to the first resource, based at least in part on the first set of resource metrics.

20. The non-transitory computer-readable storage medium of claim 15, wherein the machine-learning algorithm comprises a regression algorithm.

* * * * *